United States Patent [19]

Smentek

[11] Patent Number: 5,135,707
[45] Date of Patent: Aug. 4, 1992

[54] FUEL ROD ALIGNMENT TEMPLATE

[75] Inventor: Thomas J. Smentek, Forest, Va.

[73] Assignee: B&W Fuel Company, Lynchburg, Va.

[21] Appl. No.: 577,179

[22] Filed: Sep. 4, 1990

[51] Int. Cl.⁵ .............................................. G21C 19/00
[52] U.S. Cl. ..................... 376/261; 376/434; 376/268
[58] Field of Search ............... 376/261, 434, 268, 271; 219/86.1

[56] References Cited

U.S. PATENT DOCUMENTS

| | | | |
|---|---|---|---|
| 4,663,510 | 5/1987 | Ritter | 219/86.1 |
| 4,724,607 | 2/1988 | Beuneche et al. | 29/723 |
| 4,822,554 | 4/1989 | Wood et al. | 376/261 |

Primary Examiner—Brooks H. Hunt
Assistant Examiner—Meena Chelliah
Attorney, Agent, or Firm—Robert J. Edwards; D. Neil LaHaye

[57] ABSTRACT

A fuel rod alignment template and method for loading fuel rods in a nuclear fuel assembly. Front and rear guide plates are provided with a plurality of holes corresponding to cells in the fuel assembly to be loaded. The guide plates are rigidly connected together by connecting rods that extend beyond the front guide plate and are sized to be received in the guide tubes of the fuel assembly. When attached to the fuel assembly with the front guide plate abutting the guide tubes the holes in the guide plates and cells in the grid assemblies of the fuel assembly are in coaxial alignment. This provides positive guidance to the fuel rods as they are inserted into the fuel assembly to prevent mis-tracking and damage to the fuel assembly.

3 Claims, 1 Drawing Sheet

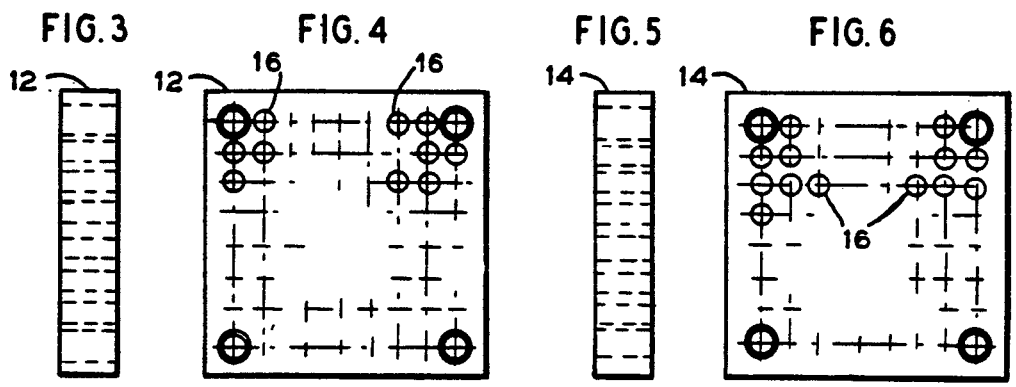
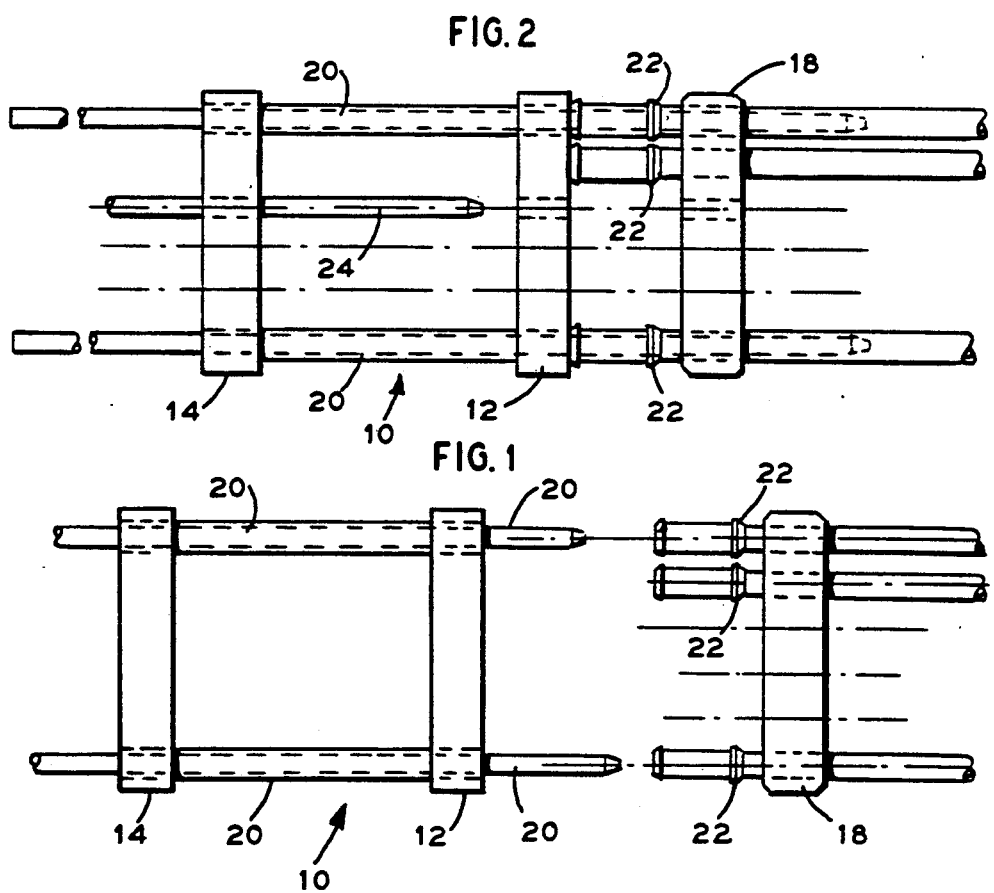

FUEL ROD ALIGNMENT TEMPLATE

BACKGROUND OF THE INVENTION

1. Field of the Invention

The invention is generally related to fuel assemblies for nuclear reactors and more particularly to the guidance of fuel rods into fuel assemblies.

2. General Background

Fuel assemblies for nuclear reactors are formed from a number of fuel rods held in position by spacer grids located along the length of the fuel rods. The spacer grids, crisscrossing metal strips on edge, provide an individual cell for each fuel rod. Some spacer grids are provided with a series of projections, grid mixing vanes, which serve to cause a predetermined turbulence and mixing of coolant during flow through the spacer grids and around the fuel rods.

The remote guidance of fuel rods into the spacer grids of the fuel assembly presents difficulties which can result in damage to the fuel rods and the spacer grids. During insertion the fuel rods can snake or mis-track into an adjacent grid cell which could cause unrepairable damage to the fuel rod and the spacer grids. The bending of grid mixing vanes is also a problem which can occur without rod snaking. Such a problem is difficult to detect and results in reduced performance of the assembly. The most common method used in the nuclear industry when remotely loading a fuel assembly is to load the new fuel assembly skeleton with non-fuel bearing rods (dummy rods) in every other cell. This creates a checkerboard array around the empty cells where fuel rods are to be inserted. After insertion of the fuel rods into the empty cells the dummy rods are removed one at a time to provide empty cells for insertion of the remaining fuel rods needed to complete the fuel assembly. Although this method works well in preventing fuel rods from snaking into adjacent cells it does not prevent the rods from bending grid mixing vanes. Also, the handling of the dummy rods significantly increases the time required to complete rod transfers. Storage of the dummy rods is also a problem after they have been introduced into the contaminated water of a site's spent fuel pool. This waste problem must then be addressed either by the provision of additional storage space or by decontamination of the dummy rods, both of which increase costs. Because of cell relaxation due to the dummy rods being inserted into the cells, special consideration must also be given to the sizing of grid cells when manufacturing a new skeleton. Resizing the cells accordingly can also increase the cost associated with manufacturing and licensing of the new skeleton.

Devices related to fuel assemblies which applicant is aware of include the following.

U.S. Pat. No. 4,317,702 discloses the use of rack elements having square fuel assembly cluster-receiving tubes which are fastened to bed plates at a small distance for storing fuel assembly clusters in a water pit.

U.S. Pat. No. 4,358,421 discloses the use of a nuclear fuel assembly lock structure for control rod guide tubes to allow removal and replacement thereof.

U.S. Pat. No. 4,448,744 discloses a method of loading and unloading a nuclear reactor wherein at least one of four fuel assemblies in a group is unloaded, a support member is inserted in place of the withdrawn fuel assembly, and then withdrawing the control rod associated with the four fuel assemblies.

U.S. Pat. No. 4,673,544 discloses the use of a plurality of axially shiftable rods disposed for pushing from a nuclear reactor fuel assembly fuel rods in the same geometric pattern and pitch as the shiftable rods.

U.S. Pat. No. 4,676,945 discloses the use of a centering device of a generally box-like cap configuration that engages the upper tie plate of a fuel bundle. Tapered dowel pins engage apertures in the tie plate for transmitting lateral forces to the fuel bundle assembly. An elongated handling pole is attached to the centering device by a ball and socket arrangement.

U.S. Pat. No. 4,788,028 discloses the use of a horizontally movable platform having a vertical telescopic mast with a gripper for gripping the upper end piece of a fuel assembly.

U.S. Pat. No. 4,793,962 discloses the use of a cassette having recesses for receiving fuel rods therein from a nuclear fuel assembly. When the cassette is full simultaneous pressure on all the rods thrusts them into a storage case.

As seen from the above, the generally used method of inserting dummy fuel rods leaves room for improvement and the known patents do not address the problem of properly inserting fuel rods into spacer grids of fuel assemblies.

SUMMARY OF THE INVENTION

The present invention solves the above problem in a straightforward manner. What is provided is a fuel rod alignment template formed from two plates with a series of holes matching the grid assembly configuration. The two plates are spaced apart and held together by connecting rods that extend beyond one of the plates. The template is attached to the fuel assembly by inserting the extending rods into the guide tubes of the fuel assembly until the template rests against the guide tubes. A fuel rod is aligned with a selected hole in the plate farthest from the fuel assembly and inserted through the plate. The positive guidance of the plate guides the rod to the corresponding hole in the plate against the guide tubes. Once the fuel rod passes through both plates the two-point support causes the rod to track straight through the center of the corresponding grid cells in the spacer grids.

BRIEF DESCRIPTION OF THE DRAWINGS

For a further understanding of the nature and objects of the present invention, reference should be had to the following description taken in conjunction with the accompanying drawings in which like parts are given like reference numerals and, wherein:

FIG. 1 is a side view of the invention in alignment with the fuel assembly for attaching thereto.

FIG. 2 is a side view of the invention attached to the fuel assembly in its operational position.

FIG. 3 is a side view of the front guide plate of the invention.

FIG. 4 is an end view of the front guide plate of the invention.

FIG. 5 is a side view of the rear guide plate of the invention.

FIG. 6 is an end view of the rear guide plate of the invention.

DETAILED DESCRIPTION OF THE PREFERRED EMBODIMENT

Referring to the drawings, it is seen in FIG. 1 and 2 that the invention is generally referred to by the numeral 10. Fuel rod alignment template 10 is generally comprised of guide plates 12 and 14.

Front guide plate 12 and rear guide plate 14, as seen in FIG. 3 through 6, are each provided with a plurality of holes 16 therethrough in a configuration matching the hole configuration of grid assembly 18 seen in FIG. 1 and 2 Guide plates 12, 14 10 are attached to each other in a spaced apart face-to-face relationship by connecting rods 20, one adjacent each corner of guide plates 12, 14. The attachment may be by any suitable means such as threading connecting rods 20 through guide plates 12, 14. Guide plates 12, 14 are maintained in a spaced apart relationship that results in corresponding holes 16 in each plate being in coaxial alignment. Connecting rods 20 extend beyond front guide plate 12 and are spaced apart in a configuration that matches that of guide tubes 22 extending from grid assembly 18. Connecting rods 20 are sized to closely fit inside guide tubes 22 to prevent side-to-side movement of template 10 relative to grid assembly 18 during fuel loading operations. When template 10 is connected to guide tubes 22 and grid assembly 18 as shown in FIG. 2, holes 16 in guide plates 12, 14 are in coaxial alignment with the holes or individual cells in grid assembly 18 designed to receive fuel rods 24. It should be understood that grid assembly 18 and guide tubes 22 shown in FIG. 1 and 2 represents only a small portion of a nuclear fuel assembly which contains a number of grid assemblies spaced along the guide tubes. The matching configuration and coaxial alignment of holes in guide plates 12, 14 and grid assembly 18, as well as the remaining grid assemblies in the fuel assembly allow loading of fuel rods into the fuel assembly with minimal possibility of a fuel rod mistracking into an adjacent grid cell and/or causing mixing vane damage. Holes 16 in guide plates 12 and 14 are sized to provide a close clearance with the fuel rods so as to provide positive guidance of each fuel rod from rear guide plate 14 to the corresponding hole in front guide plate 12 and through the corresponding holes in grid assembly 18 and remaining grid assemblies in the fuel assembly. Due to this close clearance a push rod is used to push the end of each fuel rod 24 through template 10 and into its final installed position in grid assembly 18 and the fuel assembly.

In operation, once guide plates 12, 14 are attached together by connecting rods 20, fuel rod alignment template 10 is installed in its operative position on the fuel assembly by inserting connecting rods 20 into guide tubes 22 until guide tubes 22 abut front guide plate 12. A collet may then be used to insert a fuel rod 24 into a hole 16 in rear guide plate 14 and push fuel rod 24 toward front guide plate 12 and through the corresponding hole therein. Continued pushing of fuel rod 24 causes it to be inserted through the proper hole or cell in grid assembly 18 and remaining grid assemblies of the fuel assembly. Positive guidance resulting from the close fit tolerance of fuel rod 24 in holes 16 prevents mis-tracking of fuel rod 24 as it is inserted. A push rod is used to complete insertion into the fuel assembly once the end of fuel rod 24 reaches rear guide plate 14. The procedure is then repeated until the fuel assembly is fully loaded.

It should be understood that the terms "front" and "rear" used to refer to guide plates 12, 14 are used to indicate relative position only for ease of description.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A fuel rod alignment template for loading fuel rods in a nuclear fuel assembly having spaced apart grid assemblies with a plurality of coaxially aligned individual holes, a plurality of guide tubes received in selected holes in the grid assemblies, comprising:
   a. a front guide plate provided with a plurality of holes therethrough corresponding to the plurality of holes in the spaced apart grid assemblies of the nuclear fuel assembly to be loaded;
   b. a rear guide plate provided with a plurality of holes corresponding to those in said front guide plate;
   c. a plurality of connecting rods rigidly attaching said guide plates together in a spaced apart relationship whereby the holes in said guide plates are in coaxial alignment; and
   d. said connecting rods extending beyond said front guide plate and being sized to fit within the guide tubes such that the holes in said guide plates are in coaxial alignment with the holes in the grid assemblies.

2. A method for loading fuel rods in a nuclear fuel assembly having a plurality of cells formed by spaced grid assemblies having coaxially aligned holes, comprising:
   a. providing a fuel rod alignment template comprised of a front guide plate attached to a rear guide plate in a spaced apart relationship by connecting rods, said guide plates having a plurality of coaxially aligned holes corresponding to cells in the nuclear fuel assembly to be loaded;
   b. attaching said template to said fuel assembly such that said front guide plate abuts the guide tubes of said fuel assembly and the holes in said guide plates are coaxially aligned with the cells in the fuel assembly; and
   c. inserting fuel rods through said holes in said guide plates and into said fuel assembly whereby said guide plates guide the fuel rods into corresponding cells in said fuel assembly 3. The method of claim 2, wherein said connecting rods extend beyond said front guide plate and are sized to fit within the guide tubes of the fuel assembly to be loaded.

* * * * *